United States Patent
Nakazato et al.

(10) Patent No.: US 7,083,368 B2
(45) Date of Patent: Aug. 1, 2006

(54) NUMERICAL CONTROL APPARATUS

(75) Inventors: Tomomi Nakazato, Kawasaki (JP); Hitoshi Matsuura, Hachioji (JP)

(73) Assignee: Fanuc LTD, Yamanashi (JP)

( * ) Notice: Subject to any disclaimer, the term of this patent is extended or adjusted under 35 U.S.C. 154(b) by 148 days.

(21) Appl. No.: 10/921,233

(22) Filed: Aug. 19, 2004

(65) Prior Publication Data
US 2005/0042052 A1 Feb. 24, 2005

(30) Foreign Application Priority Data
Aug. 22, 2003 (JP) .............................. 2003-298669

(51) Int. Cl.
B23C 1/027 (2006.01)
G06F 19/00 (2006.01)

(52) U.S. Cl. .................... 409/201; 409/80; 408/3; 408/236; 700/189; 700/193

(58) Field of Classification Search ............... 409/201, 409/235, 211, 216, 79–80; 700/189, 186, 700/193, 194; 408/3, 236; 451/4–5; 82/1.5, 82/118
See application file for complete search history.

(56) References Cited

U.S. PATENT DOCUMENTS

| | | | |
|---|---|---|---|
| 5,075,865 A | | 12/1991 | Kawamura et al. |
| 5,346,343 A | * | 9/1994 | Babel .......................... 409/201 |
| 5,513,113 A | * | 4/1996 | Okada et al. ................ 700/193 |
| 5,664,308 A | * | 9/1997 | Deitert ........................ 409/201 |
| 6,223,095 B1 | * | 4/2001 | Yamazaki et al. .......... 700/187 |
| 6,775,586 B1 | * | 8/2004 | Shibata et al. .............. 700/189 |
| 6,842,664 B1 | * | 1/2005 | Harada et al. .............. 700/186 |
| 6,908,265 B1 | * | 6/2005 | Walz ........................... 700/189 |
| 2003/0120376 A1 | | 6/2003 | Shibata et al. |

FOREIGN PATENT DOCUMENTS

| | | |
|---|---|---|
| EP | 0 356 522 A1 | 3/1990 |
| EP | 1 302 829 A2 | 4/2003 |
| JP | 55121507 | 9/1980 |
| JP | 60-091405 | 5/1985 |
| JP | 05-337851 | 12/1993 |

OTHER PUBLICATIONS

EP Search Report for corresponding EP Application 04 25 4843.8 dated Jan. 3, 2005.
Notice of Reasons for Rejection (Office Action) in corresponding Japanese Patent Application No. 2003-298669, mailed Oct. 25, 2005.

* cited by examiner

*Primary Examiner*—Erica Cadugan
(74) *Attorney, Agent, or Firm*—Staas & Halsey LLP

(57) ABSTRACT

A machine having X- and Y-axis linear moving axes and a pivot axis B for rotationally pivoting a pivot member having a tool arranged at a distal end thereof about an axis parallel to a Z axis is controlled. A moving command obtained by a command program commanded by a position expressed by X, Y, and Z in a three-dimensional orthogonal coordinate system is subjected to an interpolation process to calculate amounts of interpolation movement ($\Delta X$, $\Delta Y$, and $\Delta Z$) of the respective orthogonal axes. An amount of rotation $\Delta\theta$ of the pivot axis required for moving the tool by the amount of movement $\Delta Y$ in the Y-axis direction is calculated. An amount of correction movement $\delta x$ for canceling the movement in the X-axis direction caused by the rotation $\Delta\theta$ of the pivot axis B is calculated. Values ($\Delta X+\delta x$), $\Delta\theta$, and $\Delta Z$ are outputted to the X axis, the pivot axis B, and the Z axis, respectively.

1 Claim, 3 Drawing Sheets

NUMERICAL CONTROL APPARATUS

BACKGROUND OF THE INVENTION

1. Field of the Invention

The present invention relates to a numerical control apparatus which controls a machine tool having two linear moving axes orthogonal to each other and a pivot axis.

2. Description of the Related Art

As a machine tool for machining a three-dimensional-shaped workpiece, a machine having an actuator for linearly operating at least three orthogonal axes is used. In this case, a drive system such as a guide and a ball screw applied to moving ranges of the axes are required. Even though the drive system is required to be reduced in size, the drive system cannot be easily reduced in size. A machine tool which includes a simple configuration, in place of the three orthogonal linear moving axes, to make it possible to achieve a reduction in size and to perform machining of an arbitrary three-dimensional shape equivalent to machining performed by three orthogonal linear moving axes is not known.

In order to reduce the size of the above machine tool or to simplify the drive system, an easy and simple drive system is necessary in place of the linear axes. If an actuator which does not use linear moving axes is used, formation of a program for a numerical control apparatus in which commands for workpiece machining are formed in three orthogonal moving directions in workpiece machining for a three-dimensional shape must be changed, usability is also deteriorated, and inconvenience increases.

SUMMARY OF THE INVENTION

The present invention relates to a numerical control apparatus which controls an operation of a machine tool, which uses a pivot axis in place of one of three linear moving axes orthogonal to each other and performs three-dimensional machining, according to a command program.

The machine tool controlled by the numerical control apparatus comprises: a first linear moving axis; a second linear moving axis orthogonal to the first linear moving axis; a pivot axis for rotating a pivot member about the first linear moving axis or a axis parallel to the first linear moving axis; and a tool arranged at the distal end of the pivot member. In the command program, an operation route in a three-dimensional orthogonal coordinate system is commanded.

The numerical control apparatus comprises means for interpolating the operation route in the three-dimensional orthogonal coordinate system commanded by the command program in a predetermined cycle and calculating an amount of movement between interpolation points as interpolation components on the three-dimensional orthogonal coordinate system; means for calculating an amount of rotation of the tool about the pivot axis required for moving the tool by an interpolation component for a third axis orthogonal to the first and second linear moving axes; and means for calculating an amount of movement of the tool in the direction of the second linear moving axis, caused by the rotation of the tool by the calculated amount of rotation, as an amount of correction. An amount of movement of an interpolation component of the first linear moving axis is outputted to the first linear moving axis, an amount of movement corrected by the amount of correction is outputted to the second linear moving axis, and the amount of rotation is outputted to the pivot axis, in a predetermined cycle, respectively.

With the above configuration, on the basis of the command program commanded in the three-dimensional orthogonal coordinate system, a machine tool can be operated along a commanded route and at a commanded speed.

A machine tool in which one axis of orthogonal axes is replaced with a pivot axis can be driven and controlled by a command program for a conventional machine tool having three orthogonal linear moving axes. Therefore, the machine tool can be reduced in size and simplified.

BRIEF DESCRIPTION OF THE DRAWINGS

The above and other objects and characteristic features of the present invention will be apparent from the following description of embodiments explained with reference to the accompanying drawings. Of these drawings.

DESCRIPTION OF THE EMBODIMENTS

Figure 1:
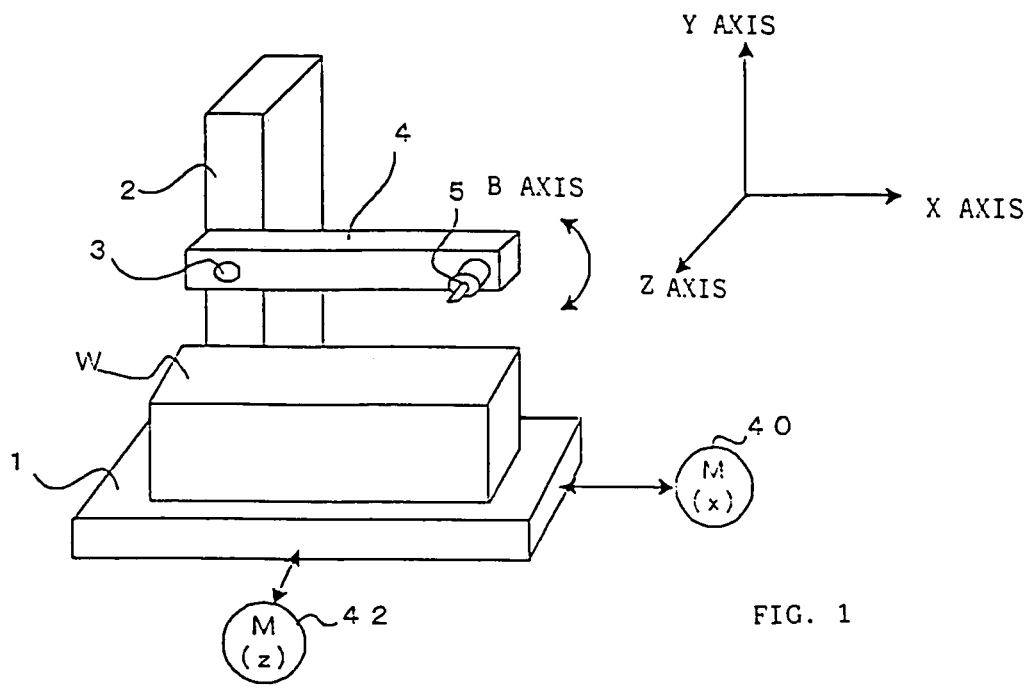
FIG. 1 is a schematic diagram of an example of a machine tool to which a numerical control apparatus according to the present invention is applied.

FIG. 1 is a schematic diagram of an example of a machine tool to which a numerical control apparatus according to the present invention is applied.

A table 1 moves in an X-axis direction and a Z-axis direction orthogonal to the X-axis direction by driving an X-axis servo motor 40 and a Z-axis servo motor 42. A shaft 3 extending in a direction parallel to the Z axis is arranged on a support 2, and a pivot member 4 is provided on the shaft 3 so as to rotate about the axis of the shaft 3. The pivot member 4 is rotationally driven by a servo motor (not shown). A tool 5 is fixed to the distal end of the pivot member 4, and the tool 5 is designed to be driven by a spindle motor (not shown). An axis about which the pivot member 4 is rotated about the shaft 3 to move the tool 5 is called a pivot axis B. A servo motor which drives the pivot axis B is called a B-axis servo motor. The tool 5 on the pivot member 4 is rotated by the B-axis servo motor on an X-Y plane.

In the machine tool according to the embodiment, the pivot member 4 having the tool 5 arranged at the distal end thereof is rotated about the pivot axis B (shaft 3) parallel to the Z axis, with respect to a workpiece W on the table 1 driven by the X-axis servo motor 40 and the Z-axis servo motor 42. When the pivot member 4 is rotated about the pivot axis B, the position of the tool 5 shifts in the X-axis direction and the Y-axis direction orthogonal to the X-axis direction and the Z-axis direction. As a result, the tool 5 moves in the X-axis, Y-axis, and Z-axis direction with respect to the workpiece W to make it possible to three-dimensionally machine the workpiece W.

Figure 2:
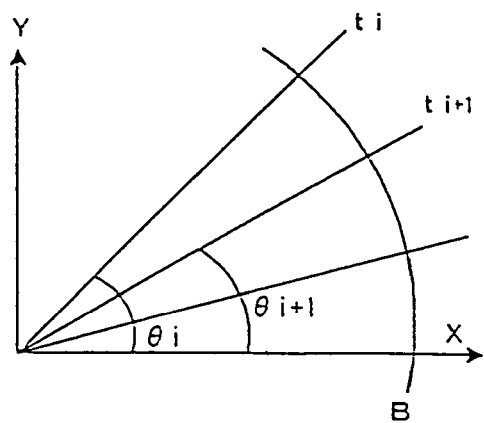
FIG. 2 is a diagram for explaining a position of a pivot axis calculated by linearly interpolating the pivot axis in units of time for interpolation.

FIG. 2 is a diagram for explaining calculation of the position of the tool 5 when rotation of the pivot axis B is interpolated at predetermined intervals. The rotating angle of the pivot axis B is equally divided by interpolation. It is assumed that a rotating angle is θi at time ti and that a rotating angle is θi+1 at time ti+1. When a distance between the center of rotation (shaft 3) of the pivot axis B and the center of rotation of the tool 5 is represented by R, the tool 5 relatively moves in the Y-axis direction by R·(sin θi+1−sin θi) with respect to the workpiece W and moves in the X-axis direction by R·(cos θi+1−cos θi) in a period of time between time ti and time ti+1.

Therefore, if the X-axis motor moves the table 1 by −R·(cos θi+1−cos θi) for a period of time between time ti and time ti+1, an X-axis moving component of the tool 5 caused by rotation of the pivot member 4 about the pivot axis B is canceled, with the result that the tool 5 linearly moves in only the Y-axis direction with respect to the workpiece W.

Figure 3:
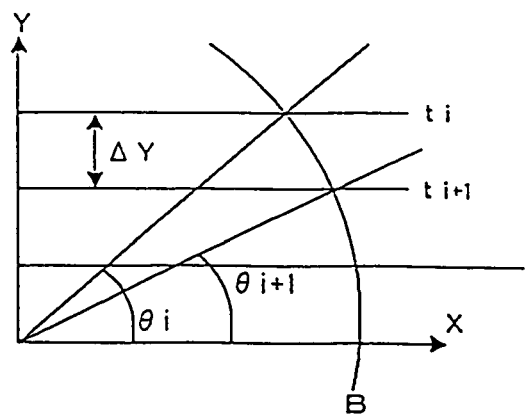
FIG. 3 is a diagram for explaining a position of the pivot axis calculated by linearly interpolating a pivot axis in a Y-axis direction of virtual linear movement.

Even though an amount of rotation is interpolated with equal angles every predetermined time, a moving speed of the tool 5 in the Y-axis direction (relative moving speed of the tool 5 with respect to the workpiece) changes depending on rotational positions. Therefore, as shown in FIG. 3, a moving command to the Y-axis serving as a virtual axis is outputted, in place of a rotational command to the pivot axis B, like a moving command to a machine tool on a conventional orthogonal coordinate system. More specifically, a moving command for a workpiece in a command program or the like is formed just like a moving command in a command program which is formed according to a conventional orthogonal coordinate system. Similar to the case of a machine tool on a conventional orthogonal coordinate system, interpolation processes are performed in the X-axis, Y-axis and Z-axis directions, based on a moving speed and a moving position commanded by a command program, to calculate interpolated amounts of movement in the respective directions. Thereafter, an amount of rotation of the pivot axis B is calculated from an amount of movement to the Y-axis serving as a virtual axis.

As shown in FIG. 3, it is assumed that a moving command of ΔY is made for the Y axis in a period of time (time interval of interpolation) between time ti and time ti+1. It is assumed that a rotating angle of the pivot axis B at time ti is θi and that a rotating angle of the pivot axis B at time ti+1 is θi+1. In this case, the following equation is established:

$$R \cdot (\sin \theta_{i+1} - \sin \theta_i) = \Delta Y$$

Therefore, $$\sin \theta_{i+1} = \sin \theta_i + \Delta Y / R$$

$$\theta_{i+1} = \sin^{-1}(\sin \theta_i + \Delta Y / R) \quad (1)$$

With the equation (1), new rotating angles θi+1 are sequentially calculated. A rotational displacement Δθ=(θi+1−θi) of the pivot axis B is calculated by using a rotating angle θi at a point of previous interpolation and a rotating angle θi+1 at a point of current interpolation. In addition, an amount of movement δx for canceling movement in the X-axis direction occurring in association with rotation of the pivot axis B from the rotating angle θi to the rotating angle θi+1 is calculated by the following equation (2):

$$\delta x = -R \cdot (\cos \theta_{i+1} - \cos \theta_i) \quad (2)$$

If the pivot axis B is rotated by an angle Δθ in a predetermined cycle (interpolation cycle), and also the X axis is moved by the amount of movement δx, then the tool 5 on the pivot member 4 can be moved in the Y-axis direction at a commanded predetermined speed.

In this case, when a moving command is outputted to the X axis, a value obtained by adding the value δx=−R·(cos θi+1−cos θi) to a value obtained by dividing the moving command by the predetermined cycle may be used as interpolation data of the X axis.

In a linear command, a circular arc command, or the like made by using synchronous three axes, i.e., the X, Y, and Z axes, 1) amounts of interpolation movement ΔX, ΔY, and ΔZ to the X, Y, and Z axes are calculated, 2) the calculated amount of interpolation movement ΔY is converted into a rotational command of the pivot axis B on the basis of the equation (1) to calculate a rotational displacement Δθ, 3) the amount of X-axis correction δx calculated by the equation (2) is added to the amount of interpolation movement ΔX, and 4) (ΔX+δx), Δθ, and ΔZ are outputted to the servo circuits of the respective axes as X-, B-, and Z-axis moving commands at the point of current interpolation movement. In this manner, the same operation as the tool operation in the machine tool on three orthogonal axes can be performed.

Figure 4:
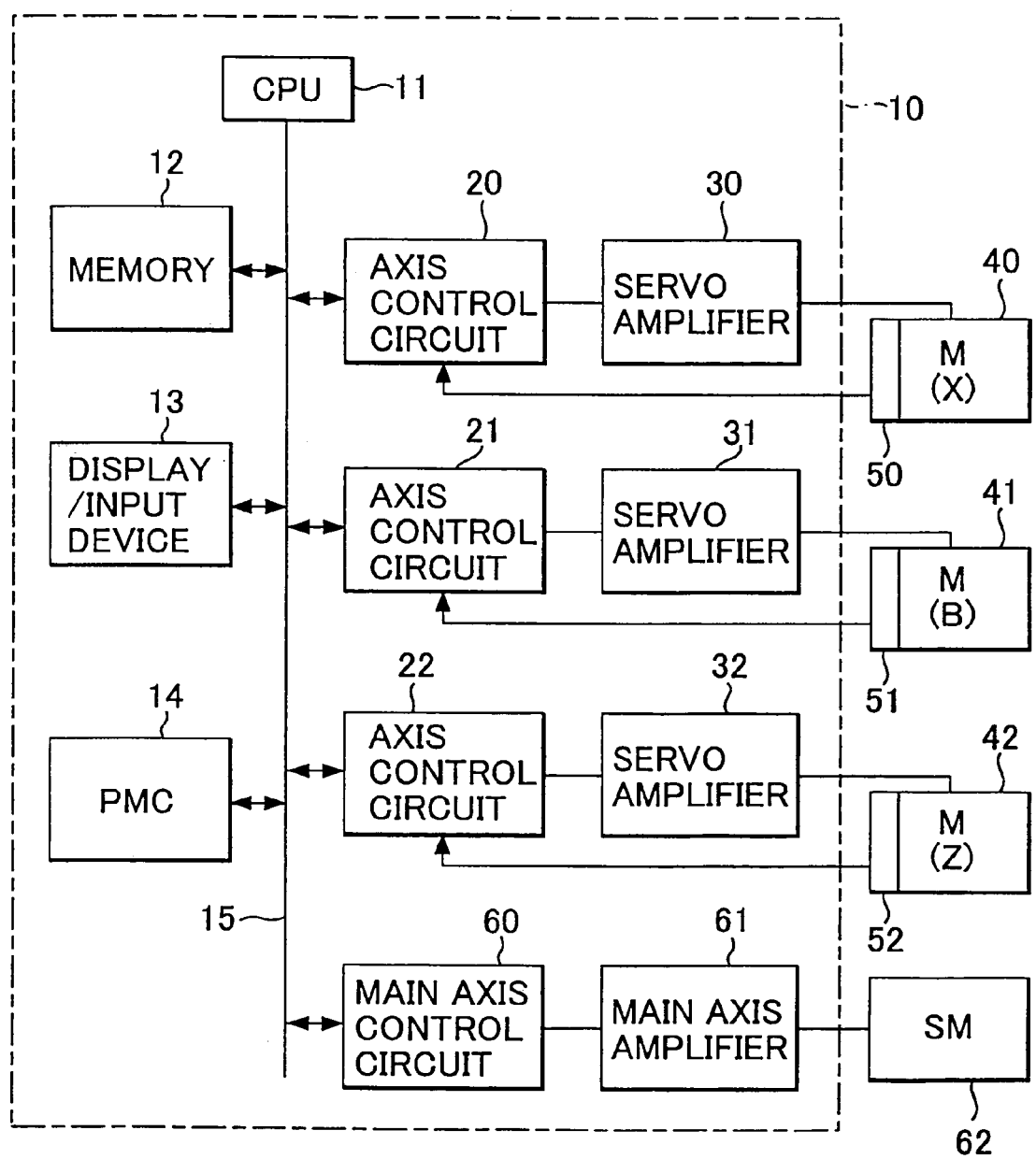
FIG. 4 is a main block diagram of a numerical control apparatus according to an embodiment of the present invention.

FIG. 4 is a main block diagram of a numerical control apparatus according to an embodiment of the present invention. This embodiment is an example of a numerical control apparatus which controls a machine tool comprising a linear moving axis being an X axis shown in FIG. 1, a linear moving axis being a Z axis orthogonal to the X axis, a pivot axis B rotating a pivot member about the Z axis or an axis parallel to the Z axis, and a tool arranged at the distal end of the pivot member to have the machine tool machine a three-dimensional shape for a workpiece.

A CPU 11 is a processor for entirely controlling a numerical control apparatus 10. A memory 12, a display/input device 13, a PMC (Programmable Machine Controller) 14, X-, B-, and Z-axis control circuits 20, 21, and 22, and a main axis control circuit 60 are connected to the CPU 11 through a bus 15. The CPU 11 reads the system program stored in the memory 12 through the bus 15, and controls the whole numerical control apparatus according to the system program. Various data inputted by an operator through the display/input device 13 constituted by an input device for inputting commands and data from the display, the keyboard, and the like, a command program formed by using the display/input device 13, and a command program inputted though an interface (not shown) are stored in the memory 12. A PMC 14 inputs a signal to and outputs a signal from an auxiliary device of the machine tool by a sequence program stored in a numerical control apparatus 100 to control the machine tool.

The axis control circuits 20 to 22 for the respective axes receive moving commands of the respective axes from the CPU 11 to output the commands of the axes to servo amplifiers 30 to 32, respectively. The servo amplifiers 30 to 32 receive the commands to drive servo motors 40 to 42 of the respective axes. The servo motors 40 to 42 of the respective axes have position/speed detectors 50 to 52 built-in, and the axis control circuits 30 to 33 receive position/speed feedback signals from the position/speed detectors 50 to 52 to perform feedback control of the positions and the speeds.

The main axis control circuit 60 receives a main axis rotation command to output a spindle speed signal to a main amplifier 61. The main amplifier 61 receives the spindle speed signal to rotate a spindle motor 62 at a commanded rotating speed, and the tool 5 arranged on the main axis is rotated. A position encoder (not shown) is provided on the main axis. According to a feedback signal from the position encoder, the main axis control circuit 60 performs feedback control of the rotating speed of the main axis.

The configuration of the numerical control apparatus described above is the same as that of the conventional numerical control apparatus. The command program for machining a workpiece with the machine tool controlled by the numerical control apparatus is the same as that formed for a machine tool using conventional three orthogonal linear moving axes. More specifically, the command program for machining a three-dimensional shape is commanded as a command of three orthogonal X, Y, and Z axes as in the conventional art. The command program is different from the conventional command program in that the CPU 11, after calculating amounts of interpolation movement ΔX, ΔY, and ΔZ to the three orthogonal axes X, Y, and Z by an interpolation process, calculates a rotating angle Δθ of the pivot axis B and an amount of movement δx for canceling X-axis movement caused by rotation of the pivot axis B, and outputs moving commands ΔX+δx, Δθ, and ΔZ to the X-axis control circuit, B-axis control circuit, and the Z-axis control circuit, respectively.

Figure 5:
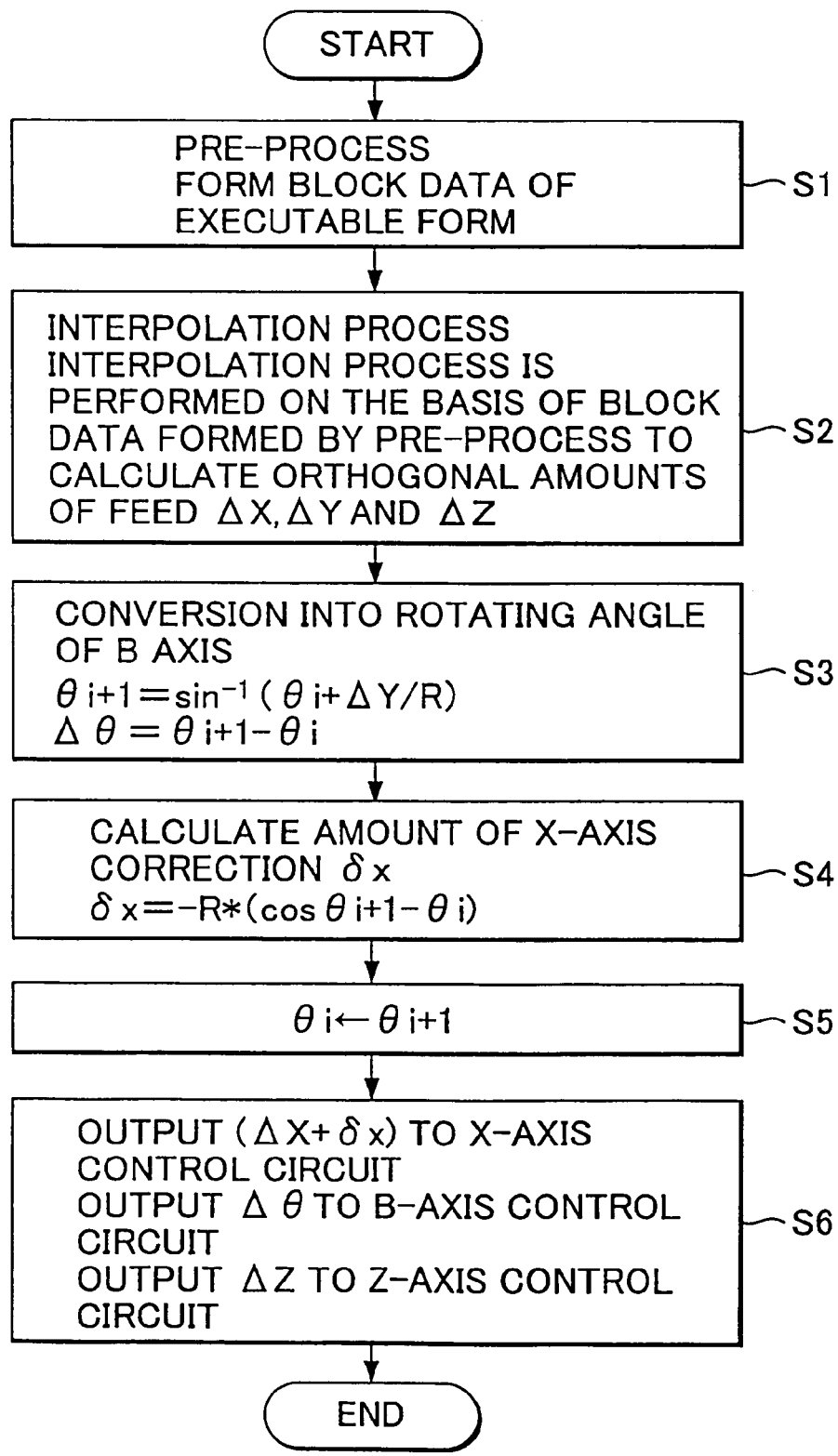
FIG. 5 is a flow chart showing processes performed by a CPU of the numerical control apparatus in FIG. 4 on the basis of a command program.

FIG. 5 is a flow chart showing an algorithm of processes executed by the CPU 11 of the embodiment on the basis of a command program.

In the processes shown in FIG. 5, a pre-process in step S1 and processes in step S2 and the subsequent steps are performed by different tasks, the pre-process in step S1 is performed by a pre-process task, and the processes instep S2 and subsequent steps are executed every interpolation cycle. However, for descriptive convenience, these processes are expressed by the same flow chart.

The CPU 11 reads one block from a command program, performs the same pre-process as the conventional pre-process, and forms block data of an executable form which can perform an interpolation distribution process (step S1). The CPU 11 executes the same interpolation process as that in the conventional art on the basis of the block data of the executable form to calculate amounts of feeding ΔX, ΔY, and ΔZ in the orthogonal X-, Y-, and Z-axis directions (step S2). The processes executed up to this step are the same as those in control of a conventional machine tool having through three orthogonal linear moving axes.

On the basis of the preset length (distance between the center of the rotating shaft 3 and the center of rotation of the tool 5) R of the pivot member 4 of the pivot axis B, a rotating angle (initial set value at the first time) θi of the pivot axis B calculated at a point of previous interpolation and stored in a register, and an amount of movement ΔY by which the tool 5 is desired to be moved in the Y-axis direction at a point of current interpolation, an arithmetic operation of the equation (1) to calculate a rotating angle θi+1 of the pivot axis B at the point of current interpolation.

Subtracting the rotating angle θi at the previous cycle, stored in the register, from the calculated rotating angle θi+1, a rotational displacement Δθ (=θi+1−θi) is calculated (step S3).

In addition, an amount of X-axis correction δx by which the tool 5 is moved in the reverse direction to cancel the X-axis movement caused by rotating the pivot axis B by an angle Δθ is calculated by the equation (2) (step S4).

The rotating angle θi+1 of the pivot axis B calculated in step S3 is stored in the register to be used as a rotating position θi at the previous cycle in the next interpolation cycle (step S5). The value obtained by adding the amount of correction δx to the amount of movement calculated in step S2 is outputted to the X-axis control circuit 20 as a moving command at the current cycle. The amount of rotation Δθ calculated in step S3 is outputted to the axis control circuit 21 of the pivot axis B, and the amount of movement ΔZ calculated in step S2 is outputted to the Z-axis control circuit 22 (step S6). The respective axis control circuits 20 to 22 perform feedback control of positions and speeds on the basis of the received moving commands and the position/speed feedback signals fed back from the position/speed detectors 50 to 52. Furthermore, the axis control circuits 20 to 22 perform current loop control to drive the servo motors 40 to 42 through the servo amplifiers 30 to 32, respectively.

The processes in steps S2 to S6 are performed every interpolation cycle. Upon completion of the movement for one commanded block, the interpolation process is performed in a similar way by using pre-processed data in the next block.

With the above processes, the tool 5 moves in the X-, Y-, and Z-axis directions with respect to the workpiece W along a route and at a speed each commanded by the command program, and machines the workpiece.

In the above example, the machine tool comprises the X- and Z-axis linear moving axes. The Y axis orthogonal to these linear moving axes is defined as a virtual axis, and the pivot member is rotated about an axis (pivot axis) parallel to the Z axis, i.e., on the X-Y plane. The machine tool is moved in the Y-axis direction by the rotation of the pivot member, and an X-axis moving command is corrected. When the pivot member is rotated about an axis (i.e., on the Y-Z plane) parallel to the X axis, not about the Z axis, movement in the Y-axis direction is generated by the rotation of the pivot member, and a Z-axis moving command is corrected.

Generally speaking, the pivot member comprising the tool arranged at the distal end thereof is rotated about the first linear moving axis of the first and second linear moving axes orthogonal to each other or an axis parallel to the first linear moving axis, so that the tool is moved in the third-axis direction orthogonal to the first and second linear moving axes and a moving command to the second linear moving axis is corrected to cancel movement of the tool in the direction of the second linear moving axis caused by the rotation of the pivot member.

What is claimed is:

1. A numerical control apparatus for controlling an operation of a machine tool according to a command program, wherein the machine tool comprises a first linear moving axis, a second linear moving axis orthogonal to the first linear moving axis, a pivot axis for rotating a pivot member about the first linear moving axis or a axis parallel to the first linear moving axis, and a tool arranged at the distal end of the pivot member, and an operation route of the tool in a three-dimensional orthogonal coordinate system is commanded in the command program, and the numerical control apparatus comprises:

means for interpolating the operation route of the tool in the three-dimensional orthogonal coordinate system commanded by the command program in a predetermined cycle and calculating an amount of movement of the tool between interpolation points as interpolation components on the three-dimensional orthogonal coordinate system;

means for calculating an amount of rotation of the tool about the pivot axis required for moving the tool by an interpolation component for a third axis orthogonal to the first and second linear moving axes; and means for calculating an amount of movement of the tool in the direction of the second linear moving axis, caused by the rotation of the tool by the calculated amount of rotation, as an amount of correction, wherein an amount of movement of an interpolation component of the first linear moving axis is outputted to the first linear moving axis, an amount of movement corrected by the amount of correction is outputted to the second linear moving axis, and the amount of rotation is outputted to the pivot axis, in a predetermined cycle, respectively.

* * * * *

UNITED STATES PATENT AND TRADEMARK OFFICE
CERTIFICATE OF CORRECTION

PATENT NO. : 7,083,368 B2  
APPLICATION NO. : 10/921233  
DATED : August 1, 2006  
INVENTOR(S) : Tomomi Nakazato et al.

It is certified that error appears in the above-identified patent and that said Letters Patent is hereby corrected as shown below:

Column 5, Line 29, change "instep" to --in step--.

Column 6, Line 50, After "axis or" change "a" to --an--.

Signed and Sealed this

Thirtieth Day of January, 2007

JON W. DUDAS  
*Director of the United States Patent and Trademark Office*